United States Patent
Chen (10) Patent No.: US 9,233,763 B1
(45) Date of Patent: Jan. 12, 2016

(54) METHODS AND SYSTEMS FOR AIRCRAFT SYSTEMS HEALTH TREND MONITORING

(71) Applicant: Gulfstream Aerospace Corporation, Savannah, GA (US)

(72) Inventor: Jeff Chen, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/463,178

(22) Filed: Aug. 19, 2014

(51) Int. Cl.
*G07C 5/00* (2006.01)
*B64D 45/00* (2006.01)
*G07C 5/08* (2006.01)

(52) U.S. Cl.
CPC .............. *B64D 45/00* (2013.01); *G07C 5/0808* (2013.01); *G07C 5/0841* (2013.01); *B64D 2045/0085* (2013.01)

(58) Field of Classification Search
USPC ................ 701/3, 29.1, 29.2, 29.7, 29.9, 33.4; 244/75.1, 194–195
See application file for complete search history.

(56) References Cited

U.S. PATENT DOCUMENTS

| | | | | |
|---|---|---|---|---|
| 3,678,256 A * | 7/1972 | Harenberg, Jr. | ...... | G05D 1/0077 244/195 |
| 6,112,141 A * | 8/2000 | Briffe | ...... | G01C 23/00 345/1.3 |
| 8,452,475 B1 * | 5/2013 | West | ...... | G07C 5/006 701/29.1 |
| 8,706,357 B1 * | 4/2014 | van den Heuvel | ...... | B64D 45/00 701/14 |
| 2008/0004840 A1 * | 1/2008 | Pattipatti | ...... | G05B 23/0243 702/183 |
| 2011/0202208 A1 * | 8/2011 | Karnik | ...... | G07C 5/0841 701/7 |
| 2012/0130701 A1 * | 5/2012 | Khella | ...... | G05B 17/02 703/13 |
| 2013/0197739 A1 | 8/2013 | Gallagher et al. | | |
| 2014/0277924 A1 * | 9/2014 | van den Heuvel | ...... | B64D 45/00 701/33.4 |

\* cited by examiner

*Primary Examiner* — Yonel Beaulieu (74) *Attorney, Agent, or Firm* — Ingrassia, Fisher & Lorenz PC (57) ABSTRACT

In one embodiment, a method for health and trend monitoring for aircraft systems includes receiving, by a processor on the aircraft, a plurality of sensor signals from a respective plurality of sensors onboard the aircraft and determining a reference signal from a subset of the plurality of sensor signals. Next, each of the plurality of sensor signals is individually compared to the reference signal to provide a plurality of difference signals. Each of the plurality of difference signals is compared to a threshold value, and a maintenance message is provided for any respective sensor associated with any of the plurality of difference signals exceeding the threshold value. An aircraft employing the health and trend monitoring system is also disclosed.

20 Claims, 8 Drawing Sheets

METHODS AND SYSTEMS FOR AIRCRAFT SYSTEMS HEALTH TREND MONITORING

TECHNICAL FIELD

Embodiments of the present invention generally relate to aircraft, and more particularly relate to methods and systems for monitoring systems and subsystems on an aircraft.

BACKGROUND

Modern aircraft are often equipped with sophisticated systems that report information and store in-flight data. For safety critical subsystems, conventional aircraft typically include a fault monitoring method configured to reject failed sensor inputs. However, due to the need to preserve system availability during operations, these fault monitoring methods are generally not designed to detect subtle performance degradation of a sensor. When an aircraft is in flight, it can be difficult to detect when sub-systems or components of an aircraft begin to operate abnormally, and/or to correctly diagnose the specific source that is causing that sub-system or component to operate abnormally. These abnormal operating conditions may persist after the aircraft has landed in some cases, but not all cases, which can make it more difficult to correctly diagnose the specific source that is causing that sub-system or component to operate abnormally.

There is a need for methods and systems for monitoring the health of an aircraft and the aircraft's various components and sub-systems. It would be desirable to provide methods and systems that can automatically detect abnormal conditions that indicate when one or more sub-systems or components of an aircraft have experienced a degradation in performance. It would also be desirable if such methods and systems can identify the specific source(s) within those particular sub-systems or components that are causing the degradation in performance so that corrective actions can be taken with respect to the identified sub-systems or components prior to fault or failure. It would also be desirable if such methods and systems execute automatically and do not require crew intervention. Furthermore, other desirable features and characteristics of the present invention will become apparent from the subsequent detailed description and the appended claims, taken in conjunction with the accompanying drawings and the foregoing technical field and background.

BRIEF SUMMARY

In one embodiment, an aircraft includes a plurality of sub-systems a health and trend monitoring system associated with one or more of the plurality of sub-systems. The health and trend monitoring system includes a plurality of sensors each providing sensor signal and a reference signal generator providing a reference signal from a subset of the sensor signals. The system also includes a comparator associated with each sensor for comparing a respective sensor signal to the reference signal to provide difference signal associated with the respective sensor providing the sensor signal. A monitor associated with each sensor compares the difference signal to a threshold value and generates a maintenance message for the respective sensor when the difference signal exceeding the threshold value.

In one embodiment, a method for health and trend monitoring for aircraft systems includes receiving, by a processor on the aircraft, a plurality of sensor signals from a respective plurality of sensors onboard the aircraft and determining a reference signal from a subset of the plurality of sensor signals. Next, each of the plurality of sensor signals is individually compared to the reference signal to provide a plurality of difference signals. Each of the plurality of difference signals is compared to a threshold value, and a maintenance message is provided for any respective sensor associated with any of the plurality of difference signals exceeding the threshold value.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention, which is defined by the claims. Furthermore, there is no intention to be bound by any theory presented in the preceding background or the following detailed description.

Figure 1:
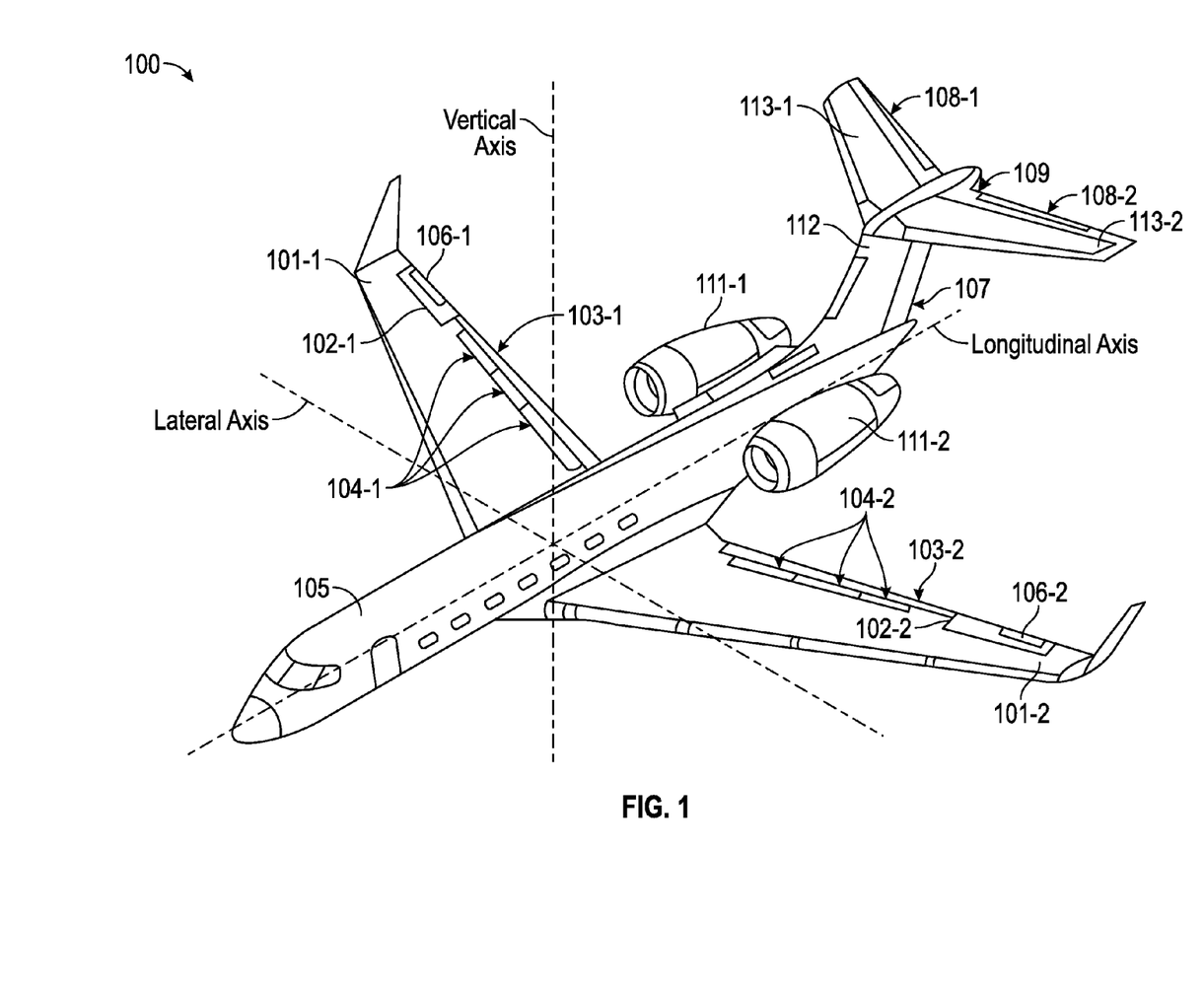
FIG. 1 is an illustration of an aircraft in accordance with an embodiment.

FIG. 1 is a perspective view of an aircraft 100 that can be used in accordance with the exemplary disclosed embodiments. In accordance with one non-limiting implementation, the aircraft 100 includes a fuselage 105, two main wings 101-1, 101-2, a vertical stabilizer 112, a horizontal tail that is comprised of two horizontal stabilizers 113-1 and 113-2 in a T-tail stabilizer configuration, and two jet engines 111-1, 111-2. For flight control, the two main wings 101-1, 101-2 each have an aileron 102-1, 102-2, an aileron trim tab 106-1, 106-2, a spoiler 104-1, 104-2 and a flap 103-1, 103-2, while the vertical stabilizer 112 includes a rudder 107, and the aircraft's horizontal stabilizers (or tail) 113-1, 113-2 each include an elevator 109 and elevator trim tab 108-1, 108-2. Although not shown in FIG. 1, the aircraft 100 also includes onboard computers, aircraft instrumentation and various flight control systems and sub-systems as described below.

Figure 2:
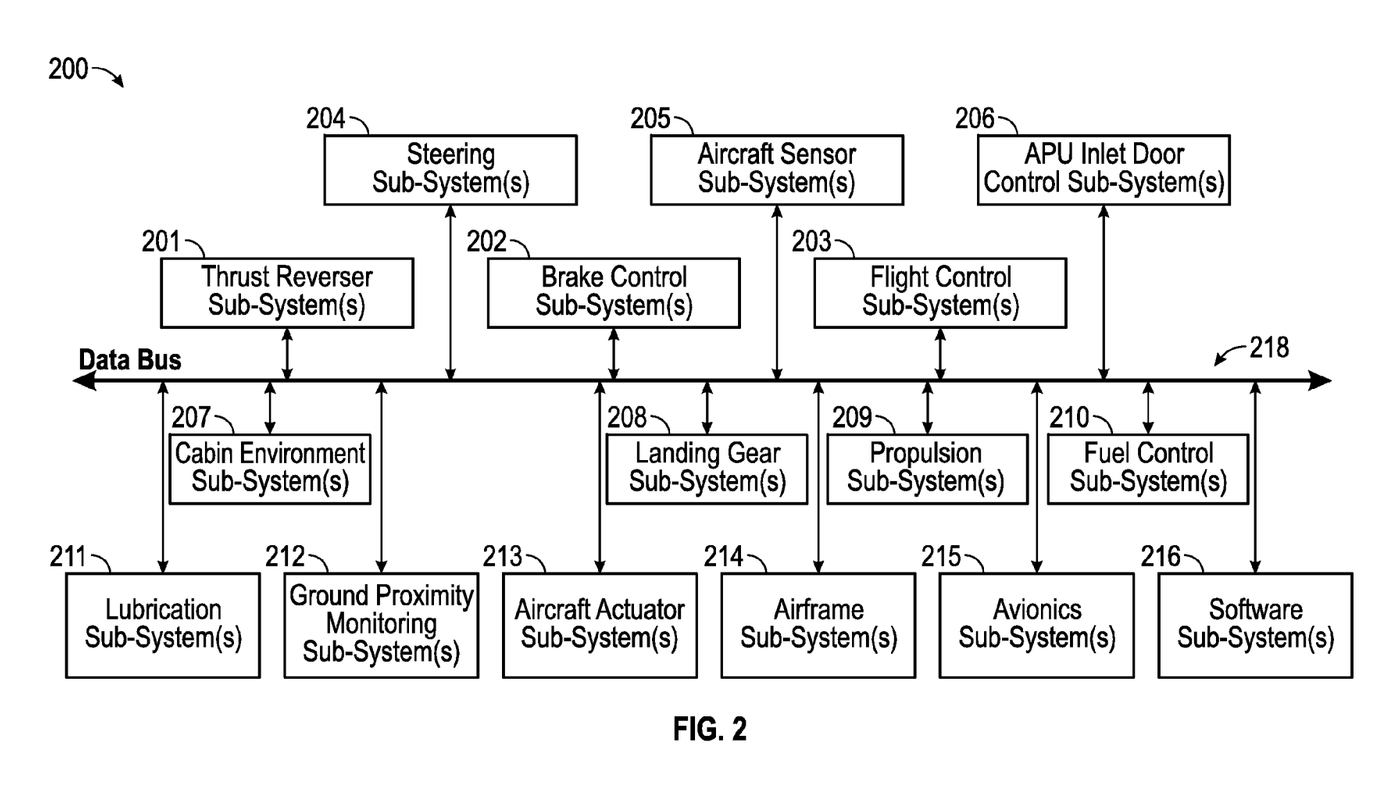
FIG. 2 is an illustration of various sub-systems of the aircraft of FIG. 1 in accordance with an embodiment.

FIG. 2 is a block diagram of various sub-systems 200 of an aircraft 100 in accordance with an exemplary implementation of the disclosed embodiments. In one exemplary, non-limiting implementation, the various sub-system(s) 201-216 include a thrust reverser control sub-system(s) 201, a brake control sub-system(s) 202, a flight control sub-system(s) 203, a steering control sub-system(s) 204, aircraft sensor sub-system(s) 205, an APU inlet door control sub-system(s) 206, a cabin environment control sub-system(s) 207, a landing gear control sub-system(s) 208, propulsion sub-system(s) 209, fuel control sub-system(s) 210, lubrication sub-system(s) 211, ground proximity monitoring sub-system(s) 212, aircraft actuator sub-system(s) 213, airframe sub-system(s) 214, avionics sub-system(s) 315, software sub-system(s) 316 each coupled to a data bus 218. The sub-system(s) 230-246 that are illustrated in FIG. 2 are exemplary only, and in other embodiments various other sub-system(s) can be included such as, for example, air data sub-system(s), auto flight sub-system(s), engine/powerplant/ignition sub-system(s), electrical power sub-system(s), communications sub-system(s), fire protection sub-system(s), hydraulic power sub-system(s), ice and rain protection sub-system(s), navigation sub-system(s), oxygen sub-system(s), pneumatic sub-system(s), information sub-system(s), exhaust sub-system(s), etc.

Although not illustrated in FIG. 2, those skilled in the art will appreciate that each of the various sub-systems can include one or more components. In addition, each of the various sub-systems can each include one or more sensors to facilitate measurement and generation of data pertaining to operation of that sub-system of the aircraft 100 (and/or a component of that sub-system), to assist in performing diagnostics and health monitoring of one or more sub-systems, etc. For critical sub-subsystems, it is common to have redundant sensors (e.g., triple redundant or quad-redundant) in the event of sensor failure. Each sensor can generate data that is used to provide information to the pilot during flight and to be used by aircraft maintenance personnel prior to or after flight. In general, a "sensor" is a device that measures a physical quantity and converts it into a signal which can be read by an observer or by an instrument. In general, sensors can be used to sense light, motion, temperature, magnetic fields, gravitational forces, humidity, vibration, pressure, electrical fields, current, voltage, sound, and other physical aspects of an environment. Non-limiting examples of sensors can include acoustic sensors, vibration sensors, air data sensors (e.g., air speed, altimeter, angle of attack sensor,), inertial sensors (e.g., gyroscope, accelerometer, inertial reference sensor), magnetic compass, navigation instrument sensor, electric current sensors, electric potential sensors, magnetic sensors, radio frequency sensors, fluid flow sensors, position, angle, displacement, distance, speed, (e.g., inclinometer, position sensor, rotary encoder, rotary/linear variable differential transducers, tachometer, etc.), optical, light, imaging sensors (e.g., charge-coupled device, infra-red sensor, LED, fiber optic sensors, photodiode, phototransistors, photoelectric sensor, etc.), pressure sensors and gauges, strain gauges, torque sensors, force sensors piezoelectric sensors, density sensors, level sensors, thermal, heat, temperature sensors (e.g., heat flux sensor, thermometer, resistance-based temperature detector, thermistor, thermocouple, etc.), proximity/presence sensors, etc.

Figure 3:
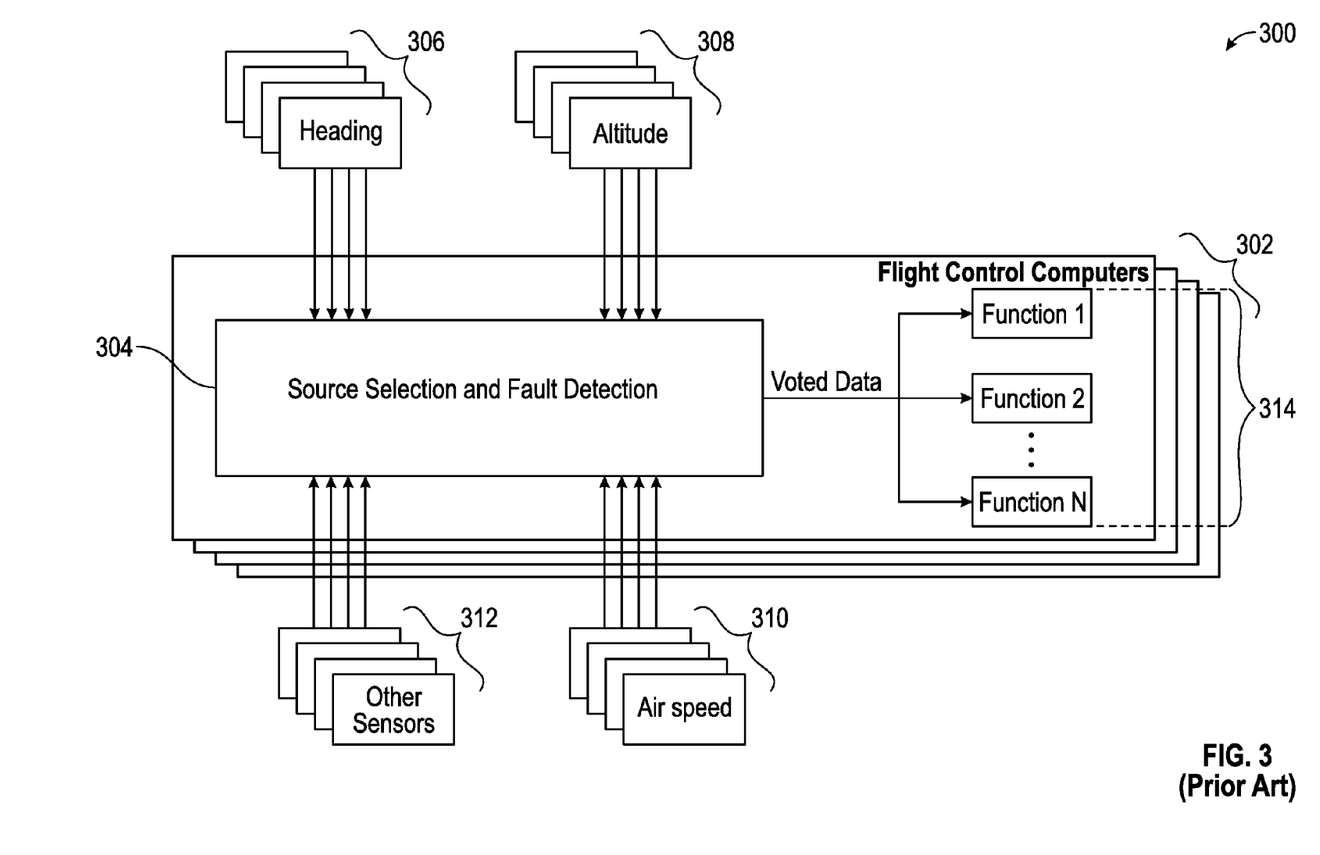
FIG. 3 is a block diagram of a conventional aircraft health monitoring system.

FIG. 3 is a block diagram of a conventional aircraft health monitoring system 300. The conventional aircraft health trend monitoring system 300 includes one or more computing flight control computers 302 that may be located in a central computing location on the aircraft or may be distributed in one or more of the sub-systems of FIG. 2. Each flight control computer 302 includes a source selection and fault detection module 304. The source selection and fault detection (SSFD) monitor 304 receives redundant inputs from a plurality of sensors monitoring an operating parameter of the aircraft or the environment within or outside the aircraft. In the illustrated example of FIG. 3, quad-redundant sensors are shown that monitor the aircraft's heading 306, altitude 308, air speed 310 and any other parameter 312 that may be desired to be monitored.

A conventional SSFD monitor 304 employs a vote and selection algorithm that utilizes the values of all input sensor signals to generate a selected value as a reference signal. This reference signal is sent to other function modules 314 that use these sensors' data for other computations. The same reference signal is also used for monitoring individual sensor's health status by comparing the reference signal against the individual sensor's signal. If a specific sensor signal differs from the reference value by some predetermined threshold value, then that specific input source is declared to have failed. Thereafter, that sensor input would be excluded from consideration.

Conventional SSFD monitors 304 are usually set up with thresholds to be as high as tolerable to minimize occurrence of nuisance trips (i.e., false failures) of the SSFD monitors, while still able to detect failures quickly and reliably to prevent real input sensor failure from causing unacceptable transients with operation of the system 300. This approach allows the system 300 to remove the failed sensor from the subsequent source selection process, but will not be effective in early detection of sensor degradation to initiate preventative maintenance actions since the fault detection thresholds are usually set at values significantly higher than the specified accuracies of the sensors.

While the conventional health monitoring system 300 is useful for detecting real time sensor failures and rejecting a faulty signal to prevent potentially unsafe system operation, long term degradation of one or more of the redundant sensors may be masked due to the needs to set the fault detection thresholds as high as tolerable by system operations to ensure maximum availability of the sensors. The high threshold levels renders the monitor incapable of detecting slow and long term sensor performance degradation beyond the sensor's performance specification. Conventional health monitoring algorithms are normally designed for real-time, near instantaneous detection of faulty sensor signal to prevent propagation of the faulty signal from causing unacceptable transients in system operation. These monitors are not designed to provide historical trend information for predicting when a sensor may fail that may be useful for preventative maintenance.

Figure 4:
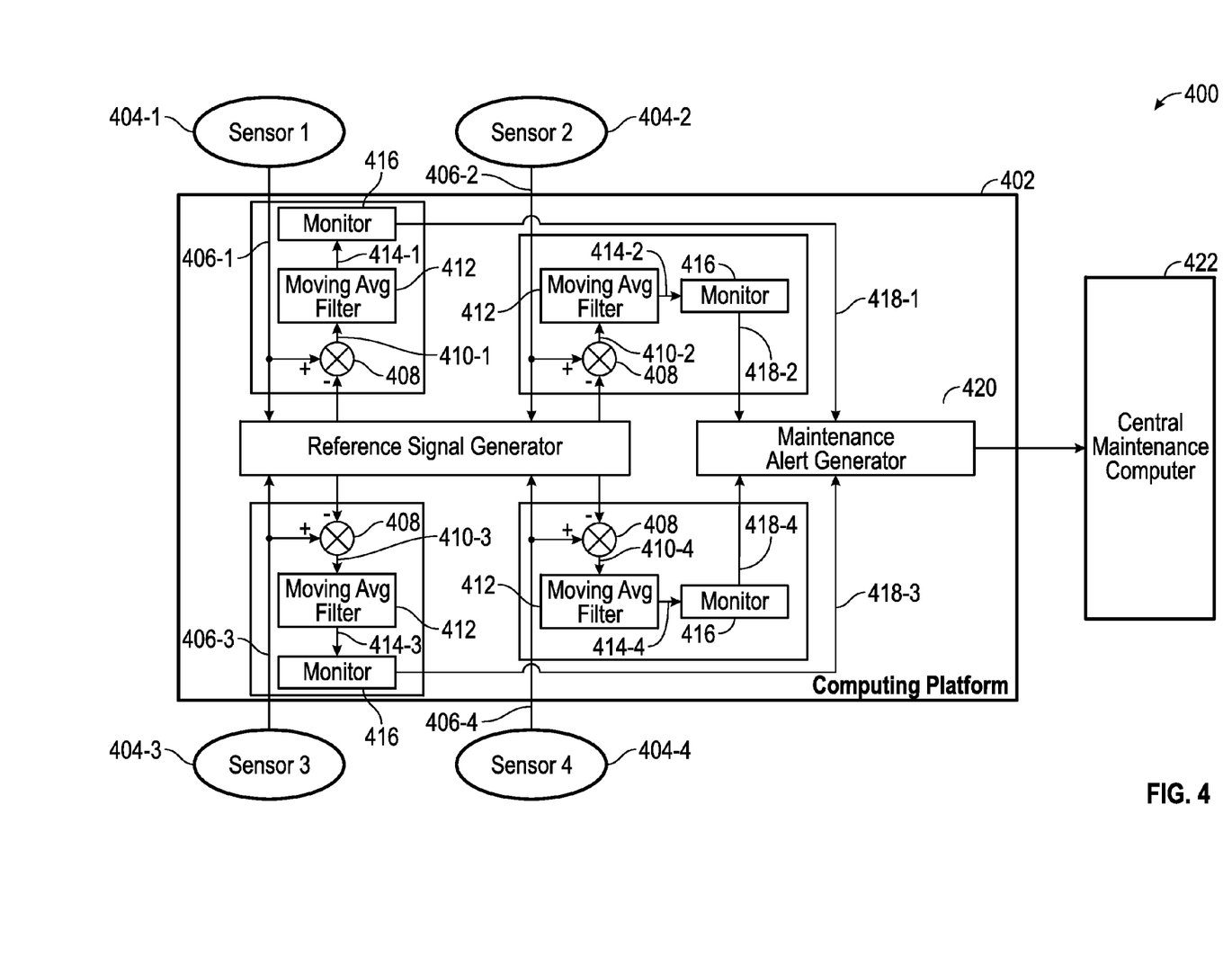
FIG. 4 is a block diagram of a long term aircraft health and trend monitoring system in accordance with an embodiment.

FIG. 4 is a block diagram of an aircraft health and trend monitoring system 400 in accordance with an embodiment. The system 400 is designed to monitor a sensor's performance over time, and is therefore better suited for detecting a sensor's slow degradation than the conventional health monitoring system 300 of FIG. 3. The system 400 includes a computing platform 402 that may be part of a centralized computing system or a computing system distributed in a sub-system of the aircraft (see, FIG. 2). Redundant sensors (e.g., quad-redundant as shown) 404-1-404-4 each input a respective measured sensor signal 406-1-406-4 into a reference signal generator 407. According to embodiments of the present disclosure, an algorithm is applied to provide an artificial reference signal. An ideal reference signal is a signal measuring the same physical parameter as the redundant sensors but is generated by a highly accurate and calibrated independent sensor. In real world applications, such a dedicated and highly accurate and calibrated independent sensor is generally not practical due to cost, accessibility, operational considerations, unacceptable complexity, or other issues. In the system 400, the reference signal is referred to as artificial as it is a processed signal using the multiple redundant sensor inputs that has accuracy very close to the specification of the sensor. As will be appreciated, due to manufacturing tolerances, installation location and installation tolerances, the accuracy of sensor signal from two same-model sensors may vary. To compensate for these variances, the algorithm of the present disclosure discards (or ignores) the highest sensor value and the lowest sensor value and averages the remaining two sensor signals to provide the reference signal. This technique is used for quad-redundant (and higher redundancy) configurations and referred to as mid-value average. For triple-redundant sensors, the highest sensor value and the lowest sensor value are discarded (or ignored) and the remaining sensor signal becomes the reference value. The technique used in the triple redundant configuration is referred to as mid-value select. This reference signal is sent from the reference signal generator 407 to comparators 408, each of which will process a respective sensor signal.

With the reference signal generated and distributed, the remaining discussion will be focused on sensor 404-1 for ease of explanation. It will be appreciated that the remaining sensors 404-2-404-4 operate similarly. As noted above, the sensor signal 406-1 from the sensor 404-1 is compared to the reference signal in comparator 408 to provide a difference signal 410-1. The difference signals 410-1-410-4 comprise sensor error measurements from the artificial ideal value of the reference signal. In some embodiments, the difference signal 410-1 is filtered in filter 412, which may be a moving average filter. A moving average filter averages all data samples within a specified time window. As time moves forward, the oldest data sample fall outside the current time window and is replaced by the latest data sample. The selection of the time window size depends on the characteristics desired for the filtered output signal. A filtered signal 414-1 is then compared to one or more thresholds in monitor 416. In some embodiments, a single threshold is used and may be set to the accuracy specification of the sensor as defined by the sensor manufacturer. In some embodiments, additional thresholds may be used. As a non-limiting example, with a second threshold set slightly (e.g., 5-10%) below the sensor accuracy threshold, it could be determined that the sensor had degraded performance although was still within the manufacturers specifications. This provides an opportunity for aircraft service personnel to inspect or replace the sensor without waiting for an actual sensor failure. If the difference signal does exceed the threshold, a fault signal 418-1 is provided to a maintenance alert generator 420. The maintenance alert generator 420 transmits a maintenance message to the central maintenance computer 422, which in turn, alerts the service personnel of a degraded or failed sensor by recording and displaying a maintenance message associated with the failed sensor.

The reference signal is continuously re-generated during each sampling frame of the redundant sensor inputs. Additionally, the computing platform 402 may also periodically store peak measured sensor signal error measurements during previous power-on cycles of the system, and then compare those stored sensor signal error measurements to peak sensor signal error measurements from a current power-on cycle. In this way, a rate of degradation value can be determined and compared to a rate of degradation threshold (e.g., 25% increase in error compared to previous power-on cycles) to provide a maintenance message that a sensor is rapidly degrading and requires service attention.

Figure 5:
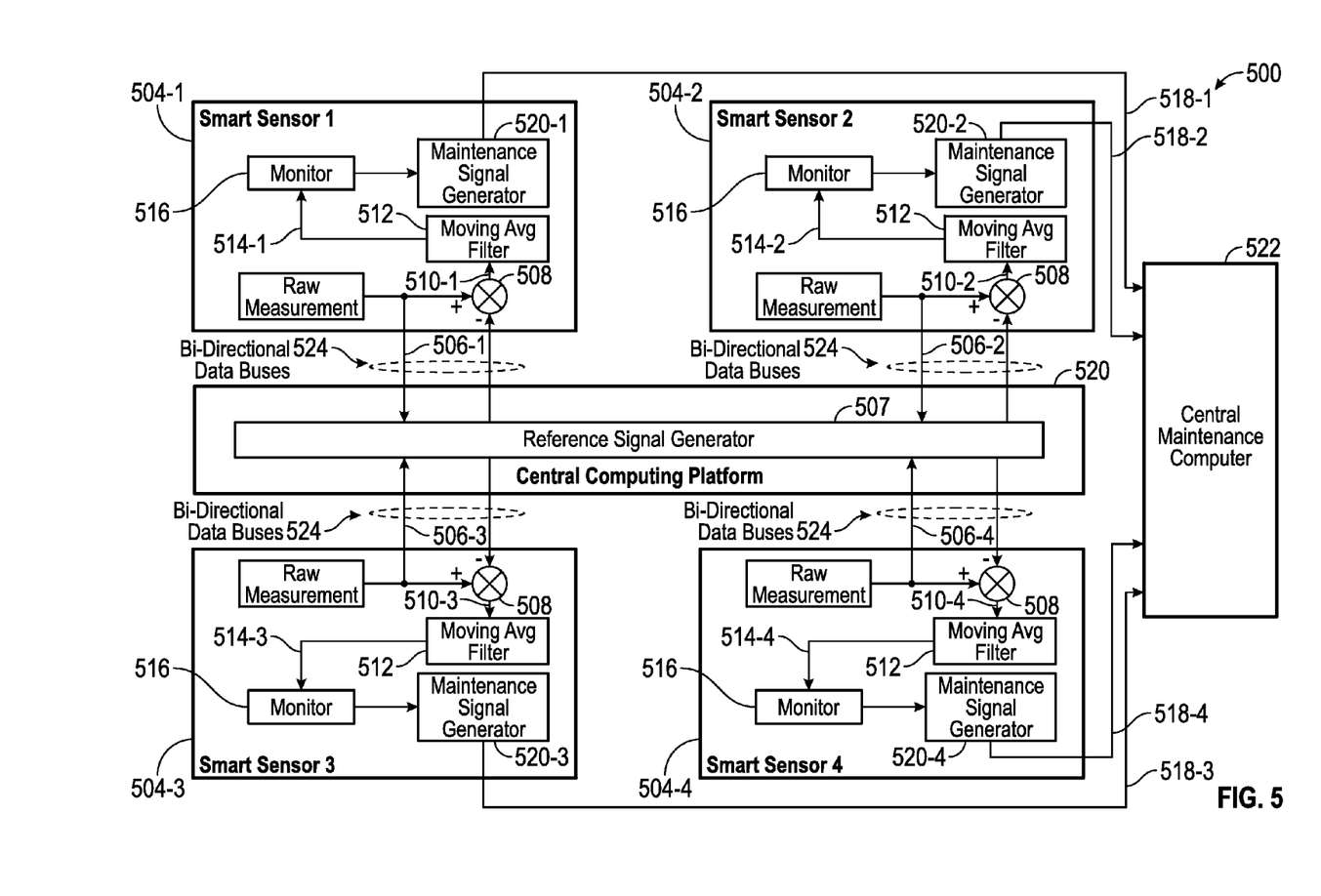
FIG. 5 is a block diagram of a long term aircraft health and trend monitoring system in accordance with an embodiment.

FIG. 5 is a block diagram of another embodiment of an aircraft health and trend monitoring system 500. The system 500 employs "smart sensors" that have the circuitry and processing capabilities to monitor themselves. The system 500 includes a computing platform 502 that may be part of a centralized computing system or a computing system distributed in a sub-system of the aircraft (see, FIG. 2). However, the maintenance alert generators 520-1-520-4 are distributed to each smart sensor for self-reporting of error and faults. The reference signal in the embodiment of FIG. 5 is created in the same manner as the embodiment in FIG. 4. Redundant smart sensors 504-1-504-4 (e.g., quad-redundant as shown) each input a respective measured sensor signal 506-1-506-4 into a reference signal generator 508. Reference signal generator 508 discards (or ignores) the highest sensor value and the lowest sensor value and averages the remaining two sensor signals to provide the reference signal. This technique is used for quad-redundant (and higher redundancy) configurations. For triple-redundant sensors, the highest sensor value and the lowest sensor value are discarded (or ignored) and the remaining sensor signal becomes the reference value.

The reference signal is sent from the reference signal generator 507 to each smart sensors 504-1-504-4, however, for ease of explanation the following discussion will focus on smart sensor 504-1 as the other smart sensors 504-2-504-4 operate similarly. As noted above, the smart sensor signal 506-1 from the smart sensor 504-1 is compared to the reference signal in comparator 508 to provide a difference signal 510-1. The difference signals 510-1-510-4 comprise sensor error measurements from the artificial ideal value of the reference signal. In some embodiments, the difference signal 510-1 is filtered in filter 512, which may be a moving average filter. A moving average filter averages all data samples within a specified time window. As time moves forward, the oldest data sample fall outside the current time window and is replaced by the latest data sample. The selection of the time window size depends on the characteristics desired for the filtered output signal. A filtered signal 514-1 is then compared to one or more thresholds in monitor 516. In some embodiments, a single threshold is used and may be set to the accuracy specification of the sensor as defined by the sensor manufacturer. In some embodiments, additional thresholds may be used. As a non-limiting example, with a second threshold set slightly (e.g., 5-10%) below the sensor accuracy threshold, it could be determined that the sensor had degraded performance although was still within the manufacturers specifications. This provides an opportunity for aircraft service personnel to inspect or replace the sensor without waiting for an actual sensor failure. If the difference signal does exceed the threshold, a fault signal 518-1 is provided to a maintenance alert generator 520. The maintenance alert generator 520 transmits a maintenance message to the central maintenance computer 522, which in turn, alerts the service personnel of a degraded or failed sensor by recording and displaying a maintenance message associated with the failed sensor.

The reference signal is continuously re-generated during each sampling frame of the redundant sensor inputs. Additionally, the computing platform 402 may also periodically store peak measured sensor signal error measurements during previous power-on cycles of the system, and then compare those stored sensor signal error measurements to peak sensor signal error measurements from a current power-on cycle. In this way, a rate of degradation value can be determined and compared to a rate of degradation threshold (e.g., 25% increase in error compared to previous power-on cycles) to provide a maintenance message that a sensor is rapidly degrading and requires service attention.

Figure 6:
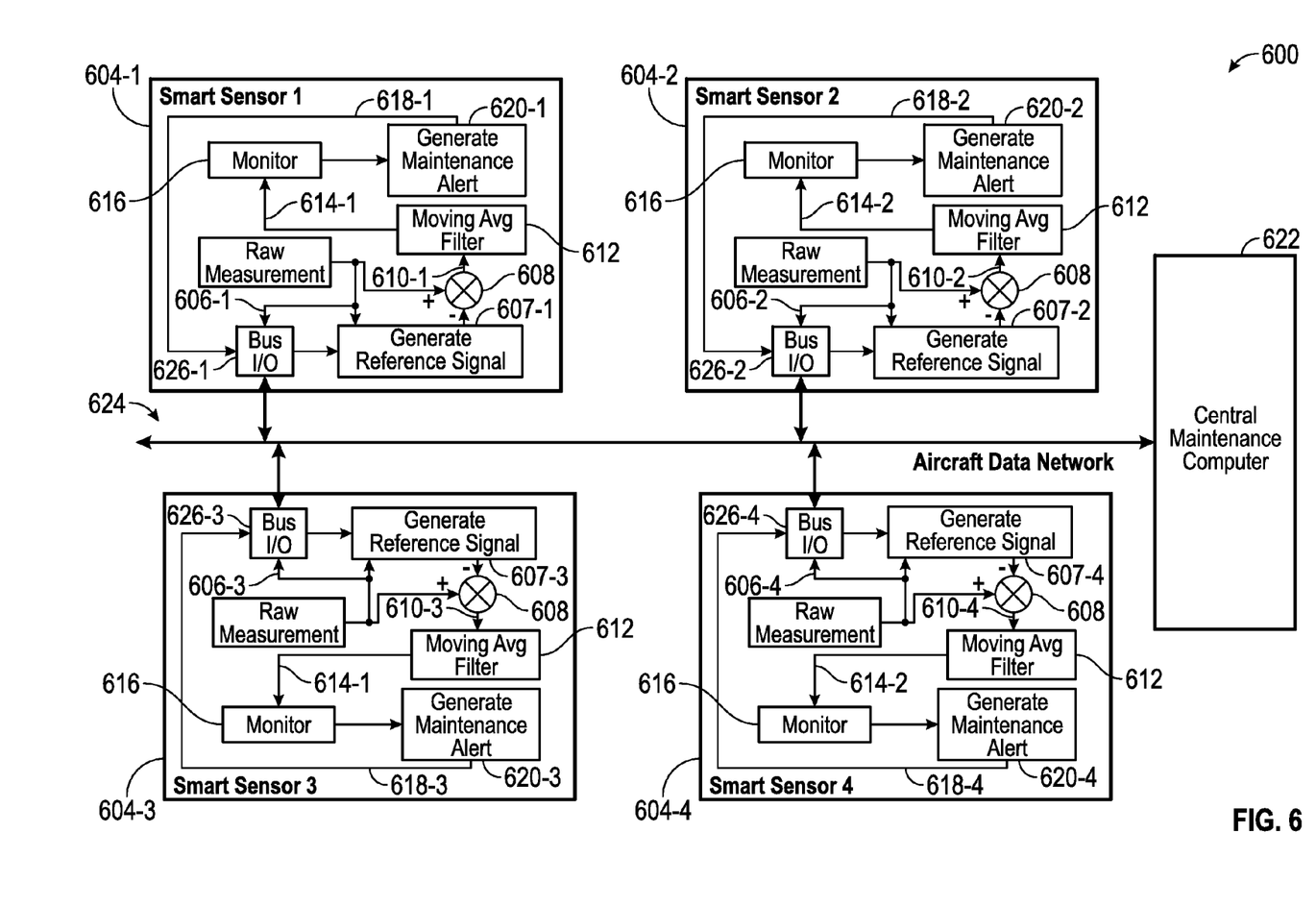
FIG. 6 is a block diagram of a long term aircraft health and trend monitoring system in accordance with an embodiment.
Figure 7:
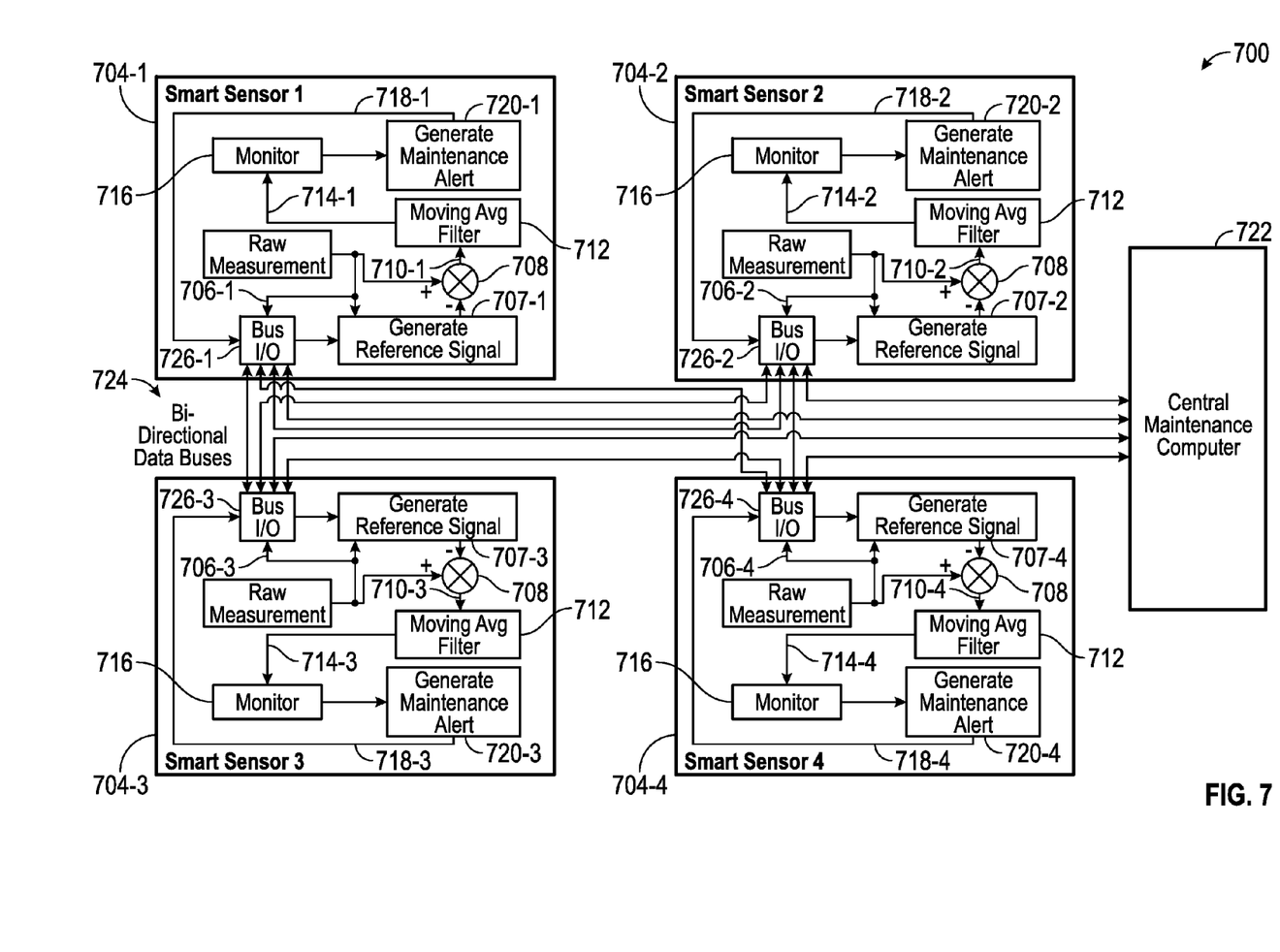
FIG. 7 is a block diagram of a long term aircraft health and trend monitoring system in accordance with an embodiment.

FIGS. 6-7 illustrate other embodiments of an aircraft health and trend monitoring system 600 and 700 that employ smart sensors. In the embodiment of FIG. 6, the bi-directional data bus 524 of FIG. 5 has been replaced with a data network bus 624 within the aircraft. Each smart sensor 601-1-604-4 includes a bus input-output (I/O) module facilitating communication between each smart sensor 601-1-604-4 and the maintenance computer 622. In the embodiment of FIG. 7, the bi-directional data bus 524 of FIG. 5 has been replaced with a data network bus 724 within the aircraft. Each smart sensor 701-1-704-4 includes a direct bi-directional data connection between each other smart sensor and the maintenance computer 722. In both embodiments of FIGS. 6-7, the reference signal generator is hosted within each smart sensor. As will be appreciated, the general operation of the smart sensors of FIGS. 6-7 is similar to that described above in connection with FIG. 5, and will not repeated here in the interest of brevity.

Figure 8:
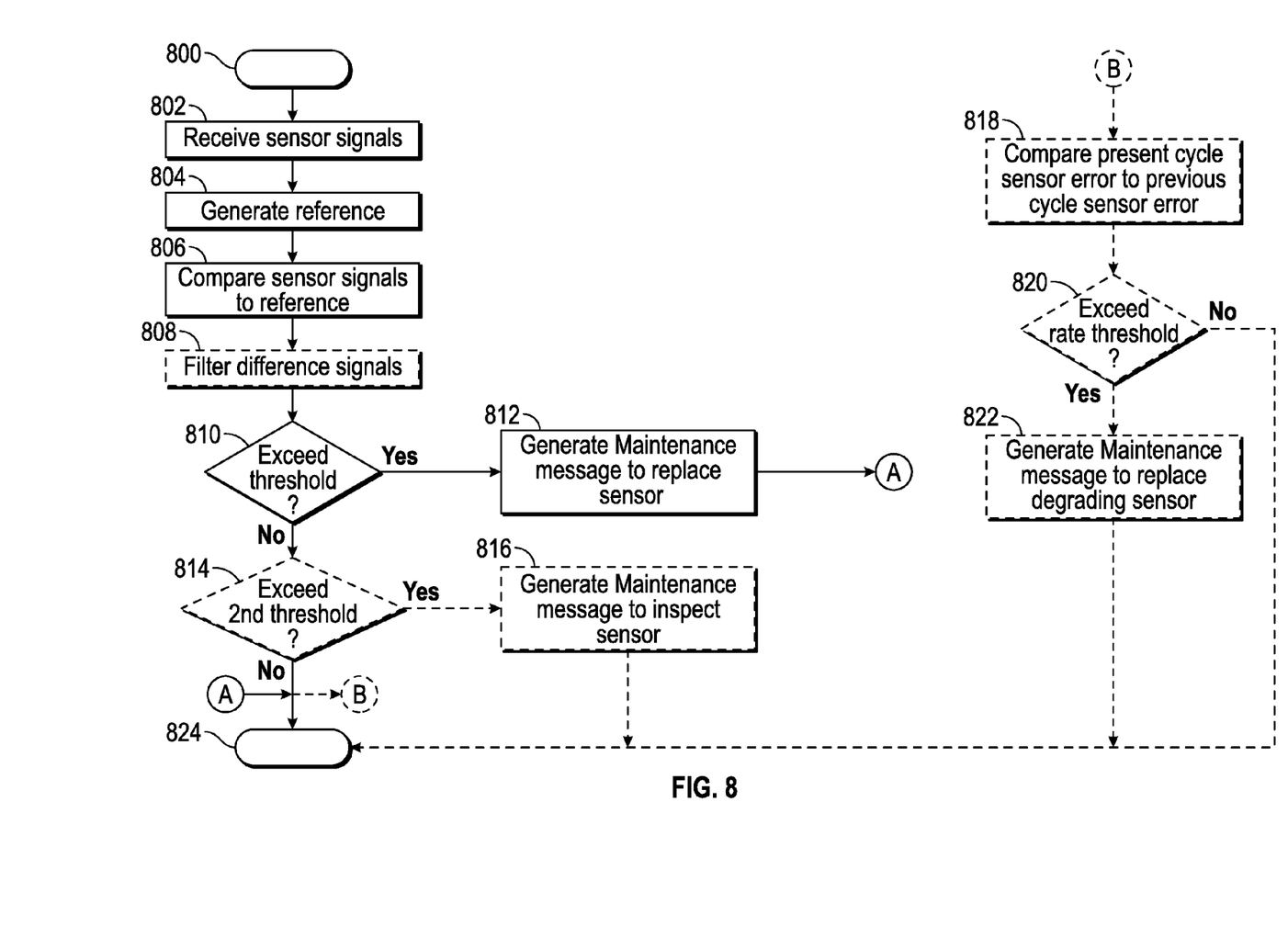
FIG. 8 is a flow diagram illustrating a method in accordance with an embodiment.

FIG. 8 is a flow diagram illustrating a method 800 in accordance with an embodiment. It will be appreciated that the method 800 of FIG. 8 is applicable both to the embodiments of FIG. 4-FIG. 7. The routine begins in block 802 where the sensor signals are received. Next, the reference signal is generated in block 804. In triple-redundant sensor embodiments, the highest sensor value and the lowest sensor value are discarded (or ignored) and the remaining sensor signal becomes the reference value. For quad-redundant (and higher redundancy) embodiments, the highest sensor value and the lowest sensor value are discarded and the remaining sensor signals are averaged to provide the reference signal. Block 806 compares (subtracts) the reference signal from the measured sensor signal to provide a difference signal. Optionally, the difference signal is filtered in block 808. Next, the difference signal is compared to a threshold, which in some embodiments comprises the sensor accuracy value specified by the sensor manufacturer or in other embodiments may comprise of accuracy requirements defined by regulatory or industry standards. If the threshold is exceeded (i.e., sensor failure), the block 812 generates a maintenance message for replacing the failed sensor. In fundamental embodiments, the routine would end in block 624 until the next processing cycle.

Optionally, in some embodiments the routine continues in block 814 where the difference signal is compared to a second threshold. The second threshold may be set to slightly (e.g., 5-10%) below the sensor accuracy threshold, allowing a determination that the sensor had degraded performance although was still within the manufacturer's specifications. If the threshold is exceeded (i.e., sensor degradation), then block 816 generates a maintenance message to inspect the degrading sensor. In some embodiments, the routine would end in block 824 until the next cycle. However, some embodiments employ the further option determining sensor rate of degradation.

Block 818 compares the sensor error measurements of the present power-on cycle to stored sensor error measurements from last power-on cycle. Block 820 determines whether the rate of sensor degradation between cycles exceeds a rate of degradation threshold. In some embodiments, the rate of degradation threshold may be set to approximately 25% above the maximum degradation rate from previous power-on cycles. If the rate of degradation threshold is exceeded (i.e., rapid sensor degradation), then block 822 generates a maintenance message for replace the degrading sensor before an actual sensor failure. Following this, the routine ends in block 824 until the next cycle.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for health and trend monitoring for aircraft systems, comprising:
   receiving, by a processor on the aircraft, a plurality of sensor signals from a respective plurality of sensors onboard the aircraft;
   determining a reference signal from a subset of the plurality of sensor signals;
   individually comparing each of the plurality of sensor signals to the reference signal to provide a plurality of difference signals, each of the plurality of differences signal associated with a respective sensor of the plurality of sensors;
   comparing each of the plurality of difference signals to a threshold value; and
   providing a maintenance message for any respective sensor associated with any of the plurality of difference signals exceeding the threshold value.

2. The method of claim 1, wherein the plurality of sensors comprises triple-redundant sensors and the processor receives a sensor signal from each one of the three triple-redundant sensors.

3. The method of claim 2, wherein determining a reference signal comprises discarding the sensor signals having the highest and lowest value and using the remaining sensor signal as the reference signal.

4. The method of claim 1, wherein the plurality of sensors comprises quad-redundant sensors and the processor receives a sensor signal from each one of the four quad-redundant sensors.

5. The method of claim 4, wherein determining a reference signal comprises:
   discarding the sensor signals having the highest and lowest value to provide two remaining sensor signals; and
   averaging the remaining two sensor signals to provide the reference signal.

6. The method of claim 1, further comprising:
filtering each difference signal to provide filtered difference signals; and
comparing comprises comparing each of the filtered difference signals to the threshold value.

7. The method of claim 1, further comprising comparing each of the plurality of difference signals to a second threshold value having a value below an accuracy specification for the plurality of sensors.

8. The method of claim 7, wherein the maintenance messages comprises:
providing a sensor degradation maintenance message for any respective sensor when the difference signal exceeds the second threshold value and does not exceed the threshold value; and
providing a sensor failure maintenance message for any respective sensor when the difference signal exceeds the threshold value.

9. The method of claim 1, further comprising:
storing the plurality of differences signal produced during a first power-on cycle to provide a plurality of stored difference signals; and
comparing each of the plurality of stored difference signals with a respective difference signal produced during a second power-on cycle to provide a respective rate of degradation value associated with each of the plurality of sensors.

10. The method of claim 9, further comprising providing a sensor rate of degradation maintenance message for any respective sensor when the respective rate of degradation value exceeds a rate of degradation value threshold value.

11. A health and trend monitoring system for aircraft systems, comprising:
a plurality of sensors each providing sensor signal;
a reference signal generator providing a reference signal from a subset of the sensor signals;
a comparator associated with each sensor for comparing a respective sensor signal to the reference signal to provide difference signal associated with the respective sensor providing the sensor signal;
a monitor associated with each sensor for comparing the difference signal to a threshold value and for generating a maintenance message for the respective sensor when the difference signal exceeding the threshold value.

12. The health and trend monitoring system of claim 11, wherein the plurality of sensors comprises three sensors configured in as triple-redundant sensors.

13. The health and trend monitoring system of claim 12, wherein the reference signal generator discards the sensor signals having the highest and lowest value and provides the remaining sensor signal as the reference signal.

14. The health and trend monitoring system of claim 11, wherein the plurality of sensors comprises four sensors configured as quad-redundant sensors.

15. The health and trend monitoring system of claim 14, wherein the reference signal generator is configured to:
discard the sensor signals having the highest and lowest value to provide two remaining sensor signals; and
average the remaining two sensor signals to provide the reference signal.

16. The health and trend monitoring system of claim 11, further comprising a filter associated with each sensor to filter the difference prior to providing the filtered difference signal to the monitor.

17. The health and trend monitoring system of claim 11, wherein the monitor is configured to compare the difference signal to a second threshold value that is below an accuracy specification for the sensor.

18. The health and trend monitoring system of claim 17, wherein the monitor:
provides a sensor degradation maintenance message for any respective sensor of the plurality of sensors when the difference signal exceeds the second threshold value and does not exceed the threshold value; and
provides a sensor failure maintenance message for any respective sensor of the plurality of sensors when the difference signal exceeds the threshold value.

19. The health and trend monitoring system of claim 11, wherein the monitor:
stores the differences signals produced during a first power-on cycle;
compares each of the stored difference signals with a respective difference signal produced during a second power-on cycle to provide a respective rate of degradation value associated with each of the plurality of sensors; and
provides a sensor rate of degradation maintenance message for any respective sensor when the respective rate of degradation value exceeds a rate of degradation threshold value.

20. An aircraft, comprising:
a plurality of sub-systems;
a health and trend monitoring system associated with one or more of the plurality of sub-systems, comprising:
a plurality of sensors each providing sensor signal;
a reference signal generator providing a reference signal from a subset of the sensor signals;
a comparator associated with each sensor for comparing a respective sensor signal to the reference signal to provide difference signal associated with the respective sensor providing the sensor signal;
a monitor associated with each sensor for comparing the difference signal to a threshold value and for generating a maintenance message for the respective sensor when the difference signal exceeding the threshold value.

* * * * *